United States Patent [19]

Nakajima

[11] Patent Number: 5,440,694
[45] Date of Patent: Aug. 8, 1995

[54] INTERFACE CIRCUIT FOR ALLOWING RECEIVING SERIAL DATA INPUT AFTER RECEIVING SERIAL INPUT SUSPENSION SIGNAL

[75] Inventor: Akio Nakajima, Kanagawa, Japan

[73] Assignee: NEC Corporation, Tokyo, Japan

[21] Appl. No.: 38,717

[22] Filed: Mar. 26, 1993

[30] Foreign Application Priority Data

Mar. 26, 1992 [JP] Japan ................... 4-067851

[51] Int. Cl.⁶ ............................. G06F 15/02
[52] U.S. Cl. ................. 395/873; 364/238.7; 364/247.3; 364/251.3; 364/DIG. 1; 395/891
[58] Field of Search .............. 395/275; 364/238.7, 364/239.2, 239.4, 239.7, 242.1, 247.3, 247.8, 251.3, 926.5

[56] References Cited

U.S. PATENT DOCUMENTS

| | | | |
|---|---|---|---|
| 4,649,512 | 3/1987 | Nukiyama | 364/900 |
| 4,914,575 | 4/1990 | Kihara et al. | 364/200 |
| 5,151,999 | 9/1992 | Marzucco et al. | 395/275 |
| 5,199,107 | 3/1993 | Ozawa | 395/325 |
| 5,283,781 | 2/1994 | Buda et al. | 370/13.1 |

Primary Examiner—Thomas C. Lee
Assistant Examiner—Moustafa M. Meky

[57] ABSTRACT

A serial input interface circuit includes a shift register connected to a data input terminal, a parallel register coupled via an output buffer to a data bus, a parallel register empty flag and a serial input suspension request flag which can be set, at any time during progress of input processing of input serial data into the shift register even while the parallel register empty flag is reset to indicate absence of parallel data in the parallel register and consequently even while the input serial data are supplied into the shift register, by a program for controlling transfer, to the data bus, of the parallel data which are stored in the parallel register when a predetermined transfer bit length of the input serial data is stored in the shift register. Setting of the serial input suspension request flag sets, in turn, a serial input suspension carry out flag immediately when the parallel register empty flag is reset. This prevents a serial input request signal generating circuit from producing a serial input request signal which would otherwise be produced to continue the input processing when the transfer bit length of the input serial data is stored in the shift register for delivery to the parallel register.

4 Claims, 7 Drawing Sheets

INTERFACE CIRCUIT FOR ALLOWING RECEIVING SERIAL DATA INPUT AFTER RECEIVING SERIAL INPUT SUSPENSION SIGNAL

BACKGROUND OF THE INVENTION

This invention relates to a serial input interface circuit which may be manufactured as a one-chip integrated circuit for use typically in a microcomputer.

In the manner which will later be described in greater detail, a serial input interface circuit is connected to a data bus and is supplied with input serial data to transfer the input serial data of a predetermined transfer bit length to the data bus as parallel data. The serial input interface circuit is put in operation of transferring the parallel data to the data bus by a handshake operation, namely, by cooperation in a handshake fashion or manner, of a serial input response or acknowledgement signal which is produced for supply to the serial input interface circuit by an external circuit in correspondence to a serial input request signal produced by the serial input interface circuit.

On carrying out transfer processing of the parallel data to the data bus, the input serial data are subjected to input processing by the handshake operation of the serial input request signal and the serial input response signal corresponding to the serial input request signal under consideration. During the input processing, the input serial data are supplied to and shifted in a shift register as a shifted signal. The shifted signal of the transfer bit length is stored in a parallel register as the parallel data. A parallel register empty flag is set to produce a parallel register empty signal of a high level to indicate that no parallel data is kept in the parallel register for transfer to the data bus. When the parallel register empty flag is reset, the parallel register empty signal is given a low level to indicate that the parallel regitser keeps a parallel data which should be transferred to the data bus.

The transfer processing is controlled by a parallel data transfer or parallel register read-out signal which is produced in compliance with a program used in dealing with the transfer processing. Inasmuch as the transfer processing is dealt with after the input processing, it is possible to understand that the program is for dealing with the transfer processing as well as the input processing.

It is often desired to suspend or interrupt the input processing by suspending production of the serial input request signal and consequently of the serial input response signal in correspondence to the serial input request signal in question. What should be noted in this connection is the fact that suspension or interruption of the input processing is objectionable while the parallel register keeps the parallel data for transfer to the data bus. In other words, the serial input interface circuit has a suspension capable state, only during which the input processing should be suspended.

It should furthermore be noted that the serial input request signal is produced by a hardware logic of the input interface circuit independently of the program. It has therefore been difficult in a conventional serial input interface circuit to suspend the input processing by a serial input suspension request signal produced as an interruption command in compliance with the program. This is because programming is difficult to produce the suspension request signal while the serial input interface circuit is put in the suspension capable state which is determined independently of the program.

It has moreover been impossible in a prior art serial input interface circuit to suspend the input processing merely while the parallel register empty flag is reset. This is because the serial input request signal is produced independently of the program when the parallel register empty signal is given the high level and therefore because the parallel register empty signal of the low level can not define production of the serial input request signal.

SUMMARY OF THE INVENTION

It is consequently an object of the present invention to provide a serial input interface circuit which is for transferring input serial data as a parallel data of a predetermined transfer bit length to a data bus and in which it is possible to make a program for dealing with transfer of the parallel datum to a data bus produce at a desired time instant a serial input suspension request signal for use in suspending input processing of supplying the input serial data to a shift register of the serial input interface circuit.

It is another object of this invention to provide a serial input interface circuit which is of the type described and in which it is possible to suspend the input processing automatically when the serial input interface circuit is put into a suspension capable state after production of the serial input suspension request signal.

It is still another object of this invention to provide a serial input interface circuit which is of the type described and in which it is possible to make the program produce the serial input suspension request signal regardless of the level of the parallel register empty signal to suspend the input processing when two transfer bit lengths of the input serial data are kept in the shift register as a serial data segment and in a parallel register as the parallel datum.

Other objects of this invention will become clear as the description proceeds.

On setting forth the gist of this invention, it is possible to understand that a serial input interface circuit makes use of a serial input request signal and a corresponding serial input response signal in a handshake fashion in starting input processing of input serial data and has a suspension capable state capable of suspending the input processing.

In accordance with this invention, the above-understood serial input interface circuit comprises: (A) first means for producing a serial input suspension request signal for suspending production of the input request signal to produce a serial input suspension carry out signal, and (B) second means for detecting the suspension capable state to produce the input request signal while the suspension capable state is detected, the second means being connected to the first means to suspend production of the input request signal when the suspension carry out signal is produced while the suspension capable state is detected.

On more particularly setting forth the gist of this invention, it is possible to understand that a serial input interface circuit is of the type set forth above, is connected to a data bus, and includes: (a) a shift register in which the input serial data are shifted as a shifted signal in response to a shift allow signal produced when the serial input request signal is produced to supply the serial input response signal to the input interface circuit, (b) a parallel register which is connected to the shift register and in which a transfer bit length of the shifted signal is stored as a parallel datum, (c) a shift counter for counting the input serial data to produce a count end signal each time when the input serial data are counted to the transfer bit length, (d) transfer means connected to the data bus, the parallel register, and the shift counter for transferring the parallel datum to the data bus when the count end signal is produced and furthermore when the parallel datum is a fresh datum that has never been transferred to the data bus, and (e) a parallel register empty flag connected to the transfer means for producing a parallel register empty signal when the parallel register is not loaded with the fresh datum.

In the later-understood serial input interface circuit, the first means comprises: (A) a serial input suspension flag for producing the Serial input suspension request signal in compliance with a program for dealing with transfer of the fresh datum, and (B) suspension carry out means connected to the parallel register empty flag and the input suspension flag for producing the serial input suspension carry out signal when the suspension request signal is produced while the parallel register empty signal is not produced, the second means comprising a serial input request signal producing circuit connected to the shift counter, the parallel register empty flag, and the suspension carry out means to detect the suspension capable state in response to the count end signal and the parallel register empty signal and to produce the serial input request signal while the suspension capable state is detected and furthermore while the suspension carry out signal is not produced.

DESCRIPTION OF THE PREFERRED EMBODIMENT

Figure 1:
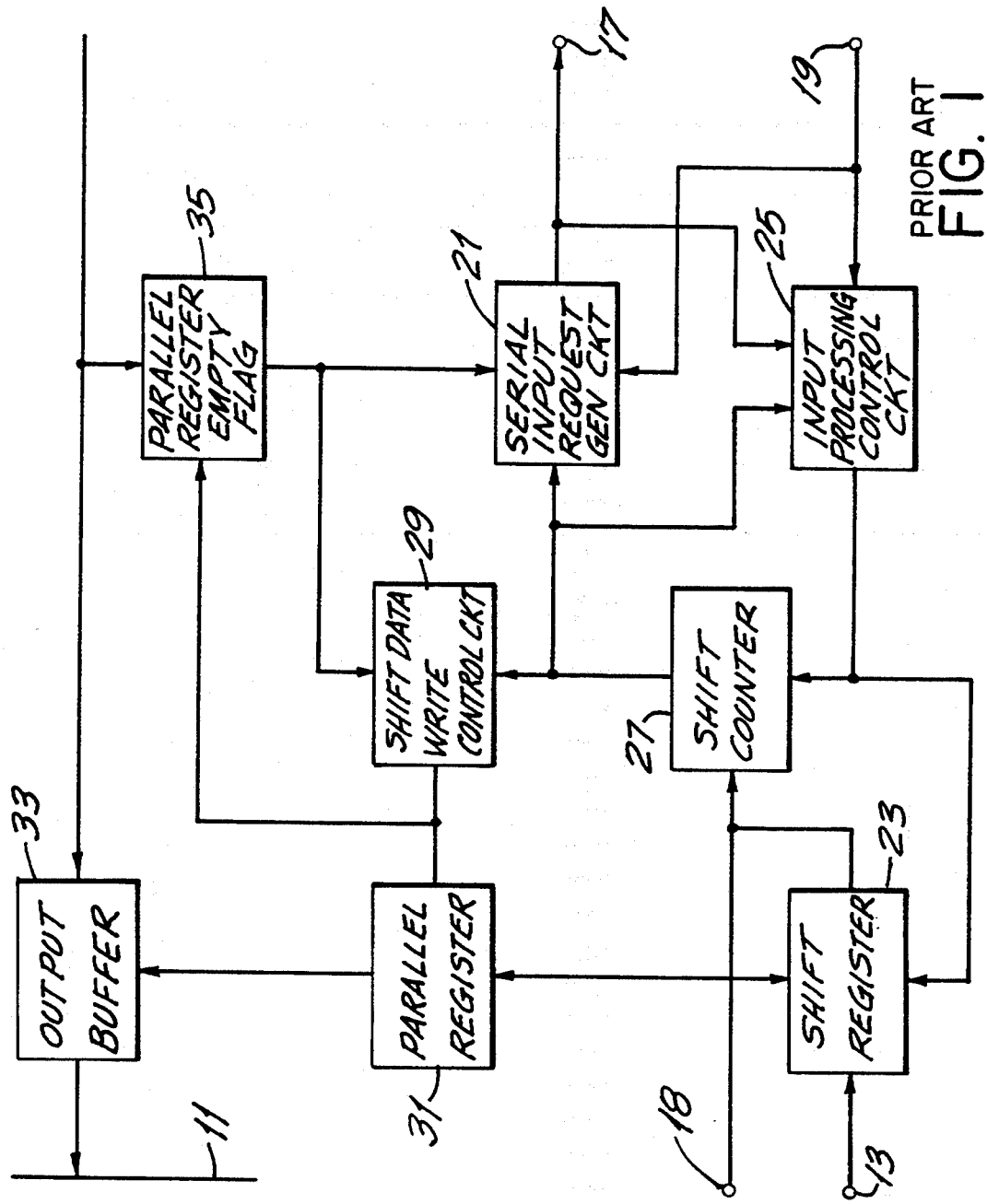
FIG. 1 is a block diagram of a conventional serial input interface circuit.

Referring to FIG. 1, a conventional serial input interface circuit will first be described. This is because the conventional serial input interface circuit is used as a basis of a serial input interface circuit according to the present invention.

Such a serial input interface circuit is connected to a data bus 11 and has a data input terminal 13, a clock input terminal 15, a control output terminal 17, and a control input terminal 19. The data input terminal 13 is supplied with a sequence of input serial data. The clock input terminal 15 is supplied with a shift clock, which may have a clock frequency of, for example, 64 kHz.

In the manner which will become clear as the description proceeds and is readily understood by one skilled in the art, the serial input interface circuit comprises various hardware wired logics. A signal therefore has a high and a low level for use in relation to such a wired logic. When given the high and the low levels, the signal is in an active and in an inactive state and may alternatively be said to be activated and inactivated. A signal with the high level will often be referred to merely as a signal.

As will presently be described, a serial input request signal generating or producing circuit 21 produces serial input request signals with the high level one at a time for supply to the control output terminal 17. An external circuit (not shown) is, for example, an encoder/decoder and produces a serial input response or acknowledgement signal with the high level for supply to the control input terminal 19. The external circuit produces the serial input response signal when supplied with, among others, the serial input request signal. In this manner, the serial input response signal may be in correspondence to the serial input request signal.

The serial input interface circuit is for transferring the input serial data of a predetermined transfer bit length as a parallel datum to the data bus 11. On carrying out transfer processing of the parallel datum to the data bus 11, the serial input interface circuit is put in operation by a handshake operation, namely, by cooperation in a handshake fashion or manner, of the serial input request signal and a corresponding serial input response signal.

For the transfer processing, the input serial data are subjected to input processing by the handshake operation of the serial input request signal and the serial input response signal corresponding to the serial input request signal under consideration. During the input processing, the input serial data are supplied to a shift register 23 and are shifted in the shift register 23 as a shifted signal by the shift clock while a shift allow signal of the high level is supplied to the shift register 23 as follows.

An input processing control circuit 25 starts to produce the shift allow signal when supplied with the serial input request signal and the serial input response signal. More particularly, the input processing control circuit 25 is supplied additionally with the shift clock through a connection which is not depicted in the figure merely for simplicity of illustration. The shift allow signal is produced when the shift clock builds up. Incidentally, it should be noted that the shift clock is used elsewhere in the serial input interface circuit without connections therefor illustrated.

In the meantime, a shift counter 27 is activated by the shift allow signal to count a count of the shift clock. When the count reaches the transfer bit length, the shift counter 27 produces a count end signal with the high level. Supplied with the count end signal, the input processing control circuit 25 gives the low level to the shift allow signal. When the count end signal gives the low level to the shift allow signal to suspend production of the shift allow signal, the shift counter 27 is inactivated. The count end signal lasts during one clock period of the shift clock. It is possible to understand that the shift counter 27 counts the input serial data.

When the shift allow signal is given the low level, the shifted signal of the transfer bit length remains in the shift register 23 as a serial data segment. Supplied with the count end signal and with a parallel register empty signal produced with the high level in the manner which will shortly be described, a shift data write control circuit 29 produces a shift data write control signal of the high level as a write pulse of a pulse width which is equal to the clock period.

Supplied with the write pulse, a parallel register 31 is activated. When the parallel register 31 is activated, the serial data segment is stored in the parallel register 31 as a parallel datum.

It may be mentioned here that a parallel data transfer or parallel register read-out signal is produced with the high level as a transfer command in compliance with a program for dealing with the transfer processing. Inasmuch as the transfer processing is carried out after the input processing, it is possible to understand that the program is for dealing with the transfer processing as well as the input processing. At any rate, the parallel data transfer signal activates an output buffer 33 to transfer the parallel datum to the data bus 11.

A parallel register empty flag 35 is set if the parallel datum is not a fresh datum that has never been transferred to the data bus 11. When set, the parallel register empty flag 35 produces the parallel register empty signal. In other words, the parallel register empty signal is produced while the parallel register 31 is not located with the fresh datum, namely, unless the parallel datum is the fresh datum.

Inasmuch as the write pulse is produced in the presence of the parallel register empty signal, the parallel datum is always the fresh datum. The parallel register empty flag 35 is reset to suspend production of the parallel register empty signal when supplied either with the parallel data transfer signal or with the write pulse.

Supplied with the count end signal and with the parallel register empty signal, the serial input request signal generating circuit 21 detects whether or not it is possible to carry out the input processing, namely, absence or presence of the shift allow signal. When it is possible to carry out the input processing, the serial input request signal generating circuit 21 produces the serial input request signal. After the serial input response signal is supplied to the control input terminal 19 to make the input processing control circuit 25 produce the shift allow signal, the serial input request signal is given the low level. It is possible to understand that the serial input response signal is supplied to the serial input request signal generating circuit 21 to suspend production of the serial input request signal, in response to which the serial input response signal under consideration is produced.

Figure 2A:
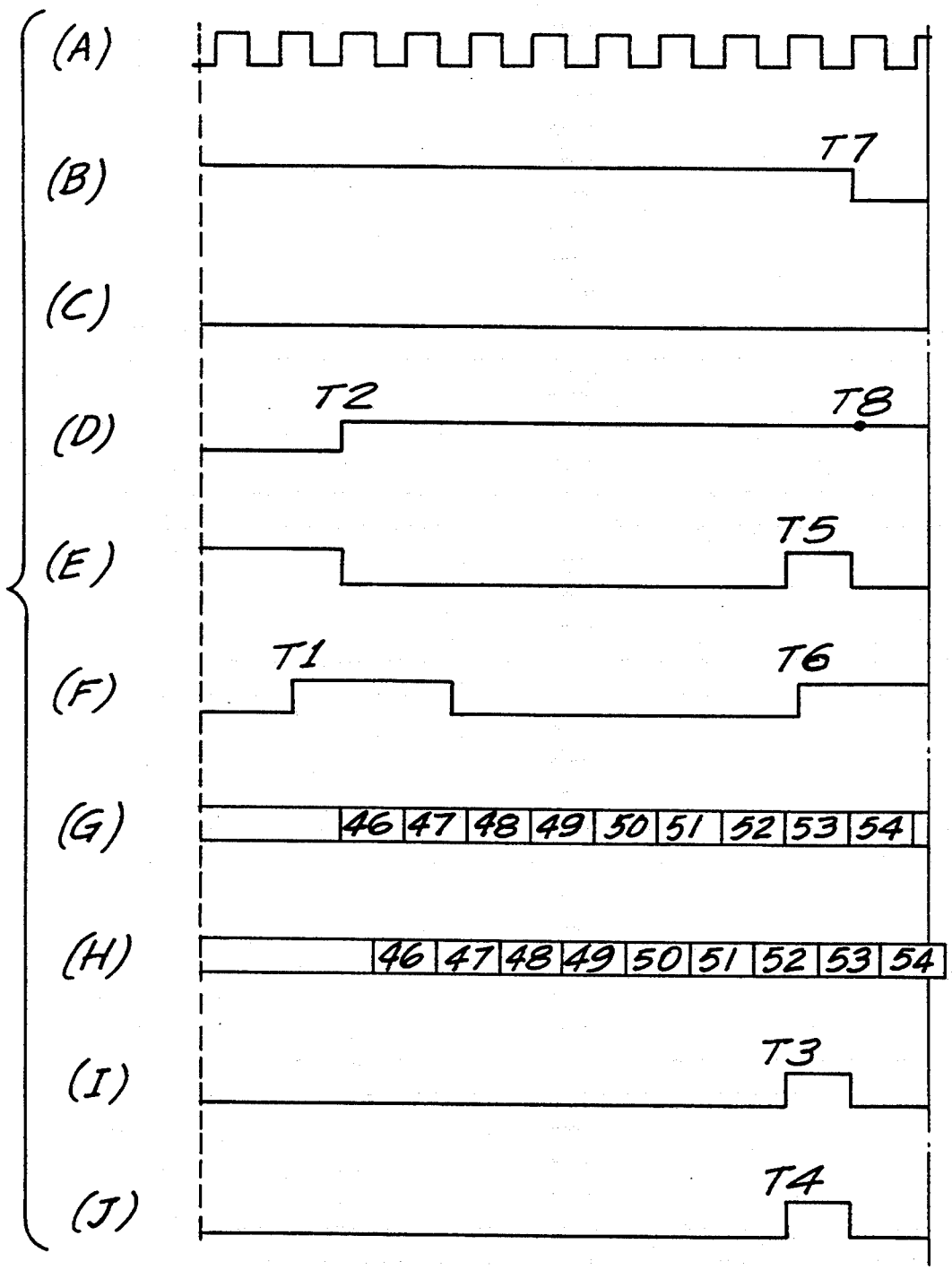
FIG. 2, depicted on two sheets as FIGS. 2 (a) and (b) with a part duplicated, is a time chart for use in describing operation of the serial input interface circuit illustrated in FIG. 1.
Figure 2B:
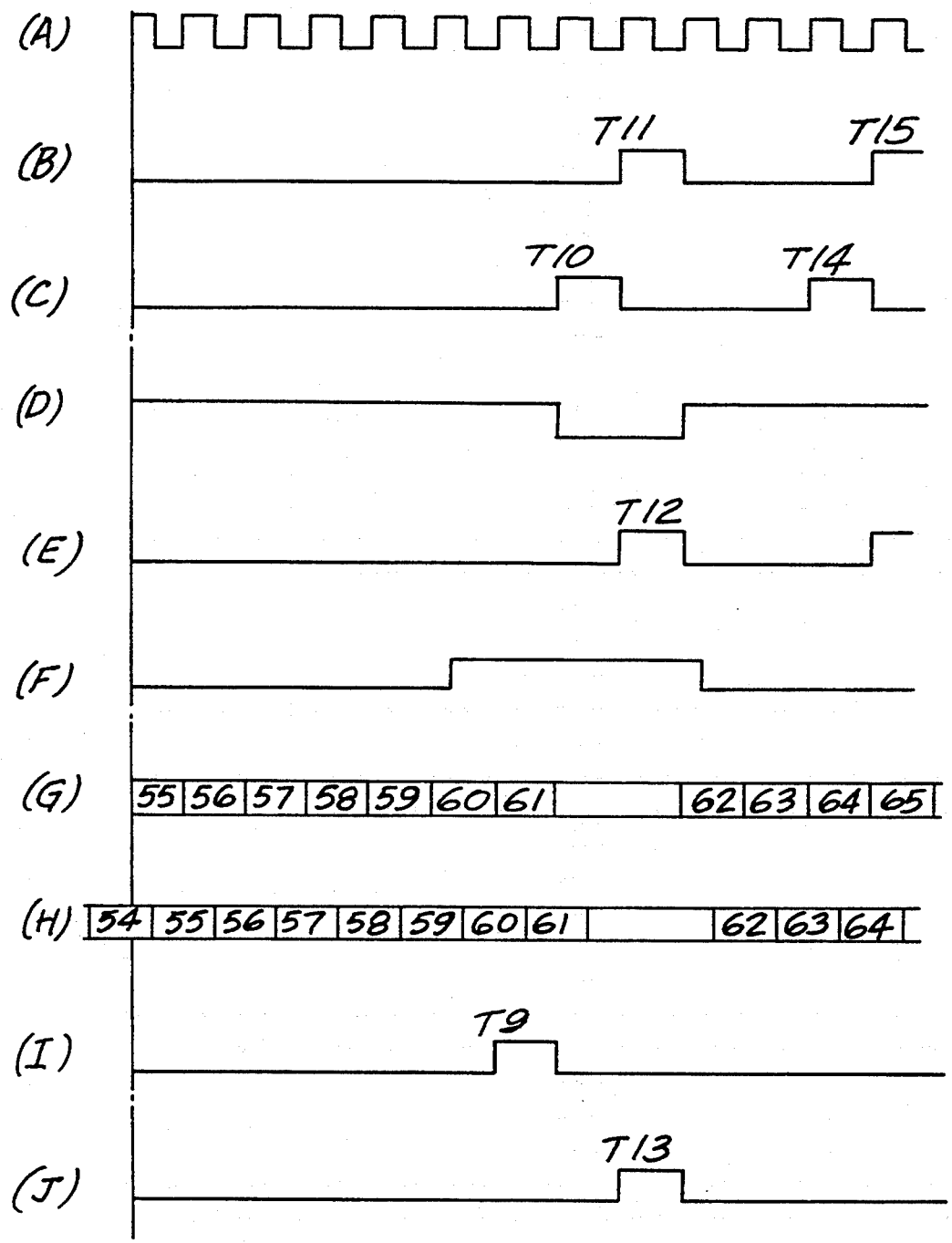

Turning to FIG. 2, namely, to FIGS. 2(a) and (b), with FIG. 1 continuously referred to, operation of the conventional serial input interface circuit will be exemplified. In FIG. 2, the shift clock is depicted along a first or top row which is labelled (A). It is presumed that the serial input interface circuit is put into operation from an initial state indicated by a vertical dashed line. At the initial state, the shift clock is near to an end of a zeroth clock period.

In the conventional serial input interface circuit and also in the serial input interface circuit according to this invention, the transfer bit length is not critical. The transfer bit length is therefore assumed to be eight bits or one byte long. Each of the serial data segment and the parallel datum consists of eight bits. It will furthermore be assumed that the input serial data are supplied to the shift register 23 from its least significant bit (LSB).

At the initial state, it is supposed that the parallel register 31 is not loaded with the parallel datum. The parallel register empty signal consequently has the high level in the manner depicted along a second row labelled (B). The parallel data transfer signal has the low level is depicted along a third row labelled (C). The shift allow signal has the low level as shown along a fourth row labelled (D). Under the circumstances, the serial input request signal is produced with the high level as illustrated along a fifth row labelled (E).

In the manner depicted along a sixth row labelled (F), it will be surmised that the serial input response signal is given the high level at a transition time instant T1 in a second clock period. When the shift clock builds up at a leading edge of a third clock period, the shift allow signal is given the high level at a transition time instant T2. The serial input request signal is given the low level. Later, the serial input response signal is also given the low level. The shift allow signal has, however, continuously the high level regardless of the low level given to the serial input request and response signals.

Through the data input terminal 13, the input serial data are supplied to the shift register 23. In the manner exemplified along a seventh row labelled (G), the input serial data have bits numbered 46, 47, ..., and 53 as a first serial data segment and bits numbered 54 through 61 as a second serial data segment. The input serial data are successively stored in the least significant bit of the shift register 23 and are shifted as the shifted signal in the shift register 23 as depicted along an eighth row labelled (H).

Meanwhile, the shift counter 27 counts the shift clock. Counting the shift clock up to the transfer bit length, namely, from the third clock period up to a ninth clock period, the shift counter 27 gives the high level to the count end signal during a tenth clock period from a transition time instant T3 as depicted along a ninth row labelled (I).

Inasmuch as the parallel register empty signal has the high level, the shift data write control circuit 29 gives the high level to, the shift data write control signal in response to the count end signal at a transition time instant T4 as depicted along a tenth or bottom row labelled (J). The first serial data segment is written in the parallel register 31 as the parallel or the fresh datum.

Inasmuch as the first serial data segement is removed to the parallel register 31 from the shift register 23, the shift register 23 is capable of receiving the input serial data. The parallel register empty signal still has the high level. The serial input request signal is given the high level at a transition time instant T5. Slightly later, the serial input response signal is given the high level at a transition time instant T6.

By the shift data write control signal, the parallel register empty signal is given the low level at a transition time instant T7. By the count end signal, the shift allow signal would be given the low level at a time instant T8. Before the low level is given to the parallel register empty signal and to the count end signal, the serial input request signal generating circuit 21 detects that the shift register 23 is capable of receiving the input serial data and keeps the shift allow signal at the high level.

When the shift clock builds down in an eleventh clock period, the second serial data segment is supplied to the shift register 23 with its least significant bit loaded with the bit numbered 54. Meanwhile, the shift counter 27 afresh counts the shift clock from the eleventh clock period to a seventeenth clock period and again gives the high level to the count end signal from another transition time instant T9 during an eighteenth clock period. This gives the low level to the shift allow signal. The input processing is suspended. Inasmuch as the parallel register empty signal has the low level, the shift data write control signal is kept at the low level.

It will be presumed that the parallel data transfer signal is given the high level by the program at a transition time instant T10. The fresh datum is transferred from the parallel register 31 to the data bus 11. This gives the high level to the parallel register empty signal at a transition time instant T11. Before the count end signal is given the low level, the serial input request signal is given the high level at another transition time instant T12. The shift data write control signal is now given the high level at another transition time instant T13. The second serial data segment is written in the parallel register 31. The parallel register empty signal is given the low level.

It will again be presumed that the parallel data transfer signal is given the high level by the program at another transition time instant T14. As the parallel datum, the second serial data segment is transferred from the parallel register 31 to the data bus 11. The parallel register empty signal is given the high level at still another transition time instant T15.

If FIGS. 1 and 2, it is often desired to suspend or interrupt the input processing by suspending production of the serial input request signal and consequently of the serial input response signal in correspondence to the serial input request signal under consideration. What should be noted in this connection is the fact that suspension or interruption of the input processing is objectionable while the parallel register 31 keeps the parallel or the fresh datum and consequently while the shift register 23 holds a serial data segment. In other words, the serial input interface circuit has a suspension capable state, only during which the input processing should be suspended.

It should furthermore be noted that the serial input request signal is produced by the wired logic of the serial input request signal generating circuit 21 independently of the program. It has therefore been difficult in the serial input interface circuit being illustrated to suspend the input processing by a serial input suspension request signal produced as an interruption command in compliance with the program. This is because programming is difficult to produce the suspension request signal while the serial input interface circuit is put in the suspension capable state which is determined independently of the program.

It has moreover been impossible in the serial input interface circuit being illustrated to suspend the input processing merely while the parallel register empty signal has the low level. This is because the serial input request signal is produced independently of the program when the serial input request signal generating circuit 21 detects, while the high level is given to the count end signal and to the parallel register empty signal, it possible to carry out the input processing and consequently because the parallel register empty signal of the low level can not define production of the serial input request signal.

Figure 3:
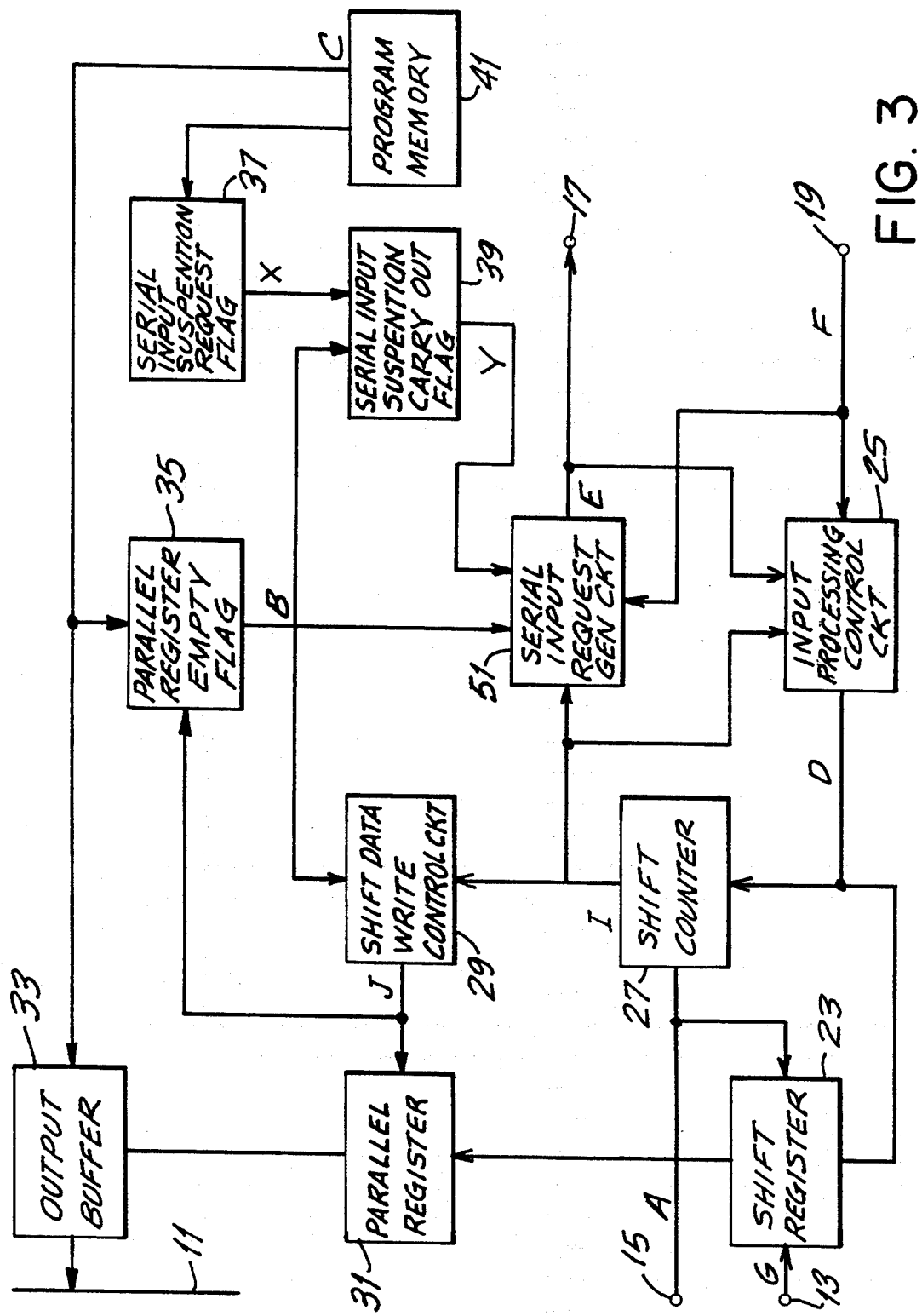
FIG. 3 is a block diagram of a serial input interface circuit according to an embodiment of the instant invention.

Referring now to FIG. 3, the description will proceed to a serial input interface circuit according to a preferred embodiment of this invention. Similar parts are designated by like reference numerals and are operable with similar signals likewise named.

In contrast to the serial input interface circuit illustrated with reference to FIGS. 1 and 2, the serial input interface circuit of FIG. 3 comprises a serial input suspension request flag 37 and a serial input suspension carry out flag 39. Controlled by a program memory 41 for keeping the program to supply the parallel data transfer signal to the output buffer 33 and to the parallel register empty flag 35, the serial input suspension (request) flag 37 is set to produce the serial input suspension request signal mentioned above. In this manner, the serial input suspension request signal is produced in accordance with the program.

The serial input suspension carry out flag 39 is supplied with the parallel register empty signal and the serial input suspension request signal. While the parallel register empty signal is not produced, namely, while the parallel register empty signal has the low level, the serial input suspension carry out flag 39 produces a serial input suspension carry out signal with the high level as will presently be detailed.

A combination of the serial input suspension request and carry out flags 37 and 39 serves as a first arrangement. Controlled by the program memory 41, the first arrangement (37, 39) produces the Serial input suspension request signal for use in suspending or interrupting production of the serial input request signal as will presently be described and in producing the serial input suspension carry out signal.

Figure 4:
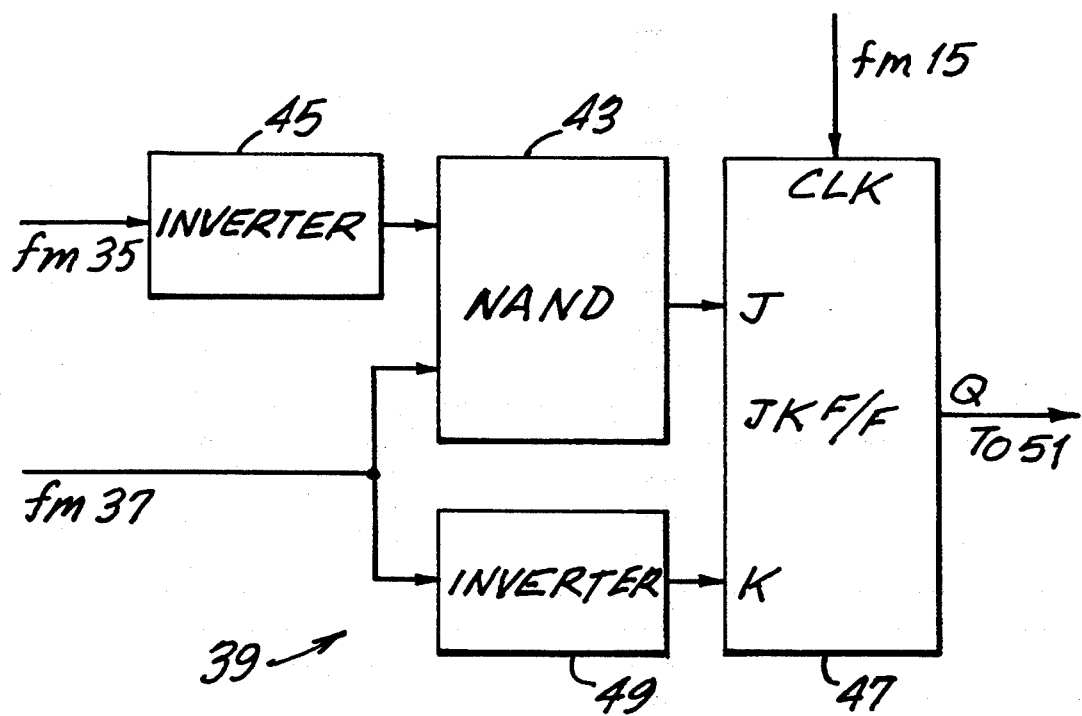
FIG. 4 is a block diagram of a serial input suspension carry out flag for use in the serial input interface circuit depicted in FIG. 3.

Turning to FIG. 4 during a short while, the serial input suspension carry out flag 39 comprises a NAND circuit 43 supplied with the parallel register empty signal from the parallel register empty flag 35 with inversion, namely, through an inverter 45. Supplied with the serial input suspension request signal from the serial input suspension flag 37, the NAND circuit 43 produces a circuit output signal.

In FIG. 4, a JK flip-flop circuit 47 has a clock input terminal CLK supplied with the shift clock and a J and a K input terminal. The circuit output signal is supplied to the J input terminal. The K input terminal is supplied with the serial input suspension request signal from the serial input suspension flag 37 with inversion, namely, through another inverter 49. The JK flip-flop circuit 47 produces the serial input suspension carry out signal with the high level from its output terminal Q when the shift clock builds down while the serial input suspension request signal has the high level and furthermore while the parallel register empty signal has the low level, namely, while the parallel register empty signal is not produced. In the manner described in connection with FIG. 1, the connection for the shift clock is not depicted in FIG. 3.

Turning back to FIG. 3, the serial input suspension carry out signal is supplied from the serial input suspension carry out flag 39 to a serial input request signal generating or producing circuit 51. In contrast to the serial input request signal generating circuit 21 described in conjunction with FIGS. 1 and 2, the serial input request signal generating circuit 51 comprises an additional wired logic. Supplied with the count end signal and with the parallel register empty signal in addition to the serial input response signal, the serial input request signal generating circuit 51 detects as before whether or not it is possible to carry out the input processing. While the parallel register empty signal has the low level and while the count end signal has the high level, the serial input interface circuit is in the suspension capable state. The serial input request signal generating circuit 51 supplies the serial input request signal to the control output terminal 17 unless the serial input suspension carry out signal is produced.

The serial input request signal generating circuit 51 serves as a second arrangement. Supplied with the count end signal, the parallel register empty signal, and the serial input suspension carry out signal in addition to the serial input response signal, the second arrangement (51) detects the suspension capable state and produces the serial input request signal while the suspension capable state is detected and furthermore while the serial input suspension carry out signal is not produced. The serial input request signal generating circuit 51 suspends or interrupts production for delivery to the control output terminal 17 of the serial input request signal when the serial input suspension carry out flag 39 is set.

Figure 5A:
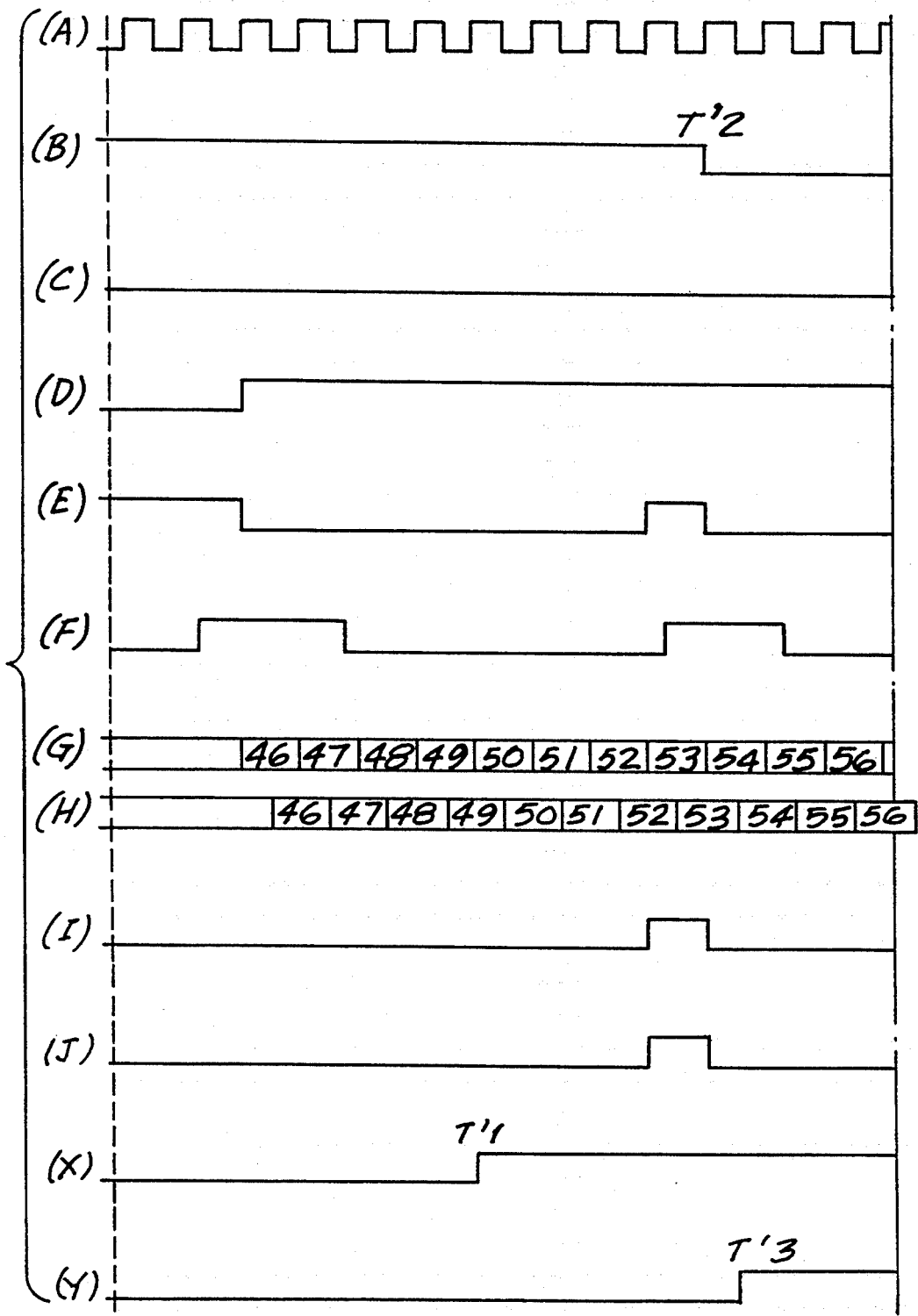
FIG. 5, drawn on two sheets as FIGS. 5 (a) and (b) partly in duplicate, is a time chart for use in describing operation of the serial input interface circuit shown FIG. 3.
Figure 5B:
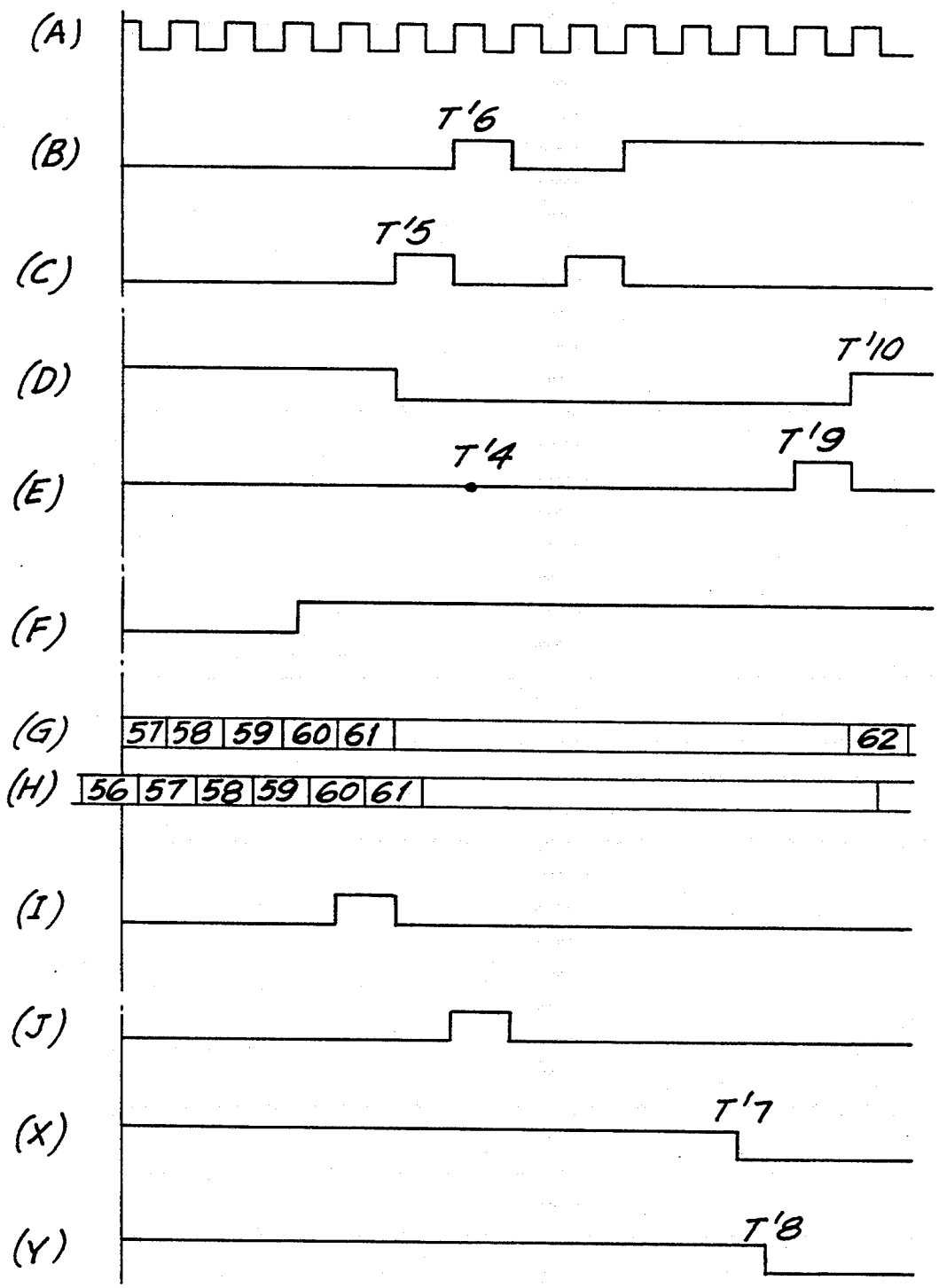

Referring to FIG. 5, namely, to FIGS. 5 (a) and (b), operation will be described in connection with the serial input interface circuit illustrated with reference to FIGS. 3 and 4. The shift clock, the parallel register empty signal, the parallel data transfer signal, the shift allow signal, the serial input request and response signals, the input serial data, the shifted signal, the count end signal, and the shift data write control signal are depicted along first through tenth rows labelled (A) through (J) as in FIG. 2. The serial input suspension request signal is illustrated along an eleventh row labelled (X). The serial input suspension carry out signal is shown along a twelfth or bottom row labelled (Y). Such labels are added to FIG. 3 without the parentheses except for the label (H).

Various time instants are designated by reference symbols starting with a capital letter with a prime T'. It will readily be possible to relate the time instants of FIG. 5 to those indicated in FIG. 2. The initial state is indicated by a vertical dashed line near an end of a zeroth clock period.

At the initial state, the parallel register empty signal has the low level like in FIG. 2. The program does not yet produce the parallel data transfer signal. The shift allow signal has the low level. The serial input request signal is given the high level.

When the serial input response signal is produced as in FIG. 2, the shift allow signal is given the high level. This starts the input processing, giving the low level to the serial input request signal. Once started, the input processing proceeds from the first serial data segment to the second serial data segment. Meanwhile, the count end signal is twice produced.

It is now surmised that the serial input suspension flag 37 is set by the program to give the high level to the serial input suspension request signal at a transition time instant T'1. Set of the serial input suspension flag 37 suspends the input processing as follows.

In the manner described in conjunction with FIG. 2, the parallel register empty signal is given the low level at a transition time instant T'2 between tenth and eleventh clock periods. When the shift clock builds down in the eleventh clock period, the serial input suspension carry out flag 39 is set to give the high level to the serial input suspension carry out signal at a transition time instant T'3.

Responsive to the serial input suspension carry out signal, the serial input request signal generating circuit 51 inhibits production of the serial input request signal. As a result, the serial input request signal is not given the high level at a time instant T'4 even after the parallel data transfer signal is produced by the program at a transition time instant T'5 to give the high level to the parallel register empty signal at a transition time instant T'6.

When the serial input suspension flag 37 is reset by the program, the serial input suspension request signal is given the low level as exemplified at a transition time instant T'7. It does not matter how long the serial input suspension flag 37 is kept in a set state. It is surmised that the transition time instant T'7 is between twenty-fourth and twenty-fifth clock periods. When the shift clock builds down in the twenty-fifth clock period, the serial input suspension carry out signal is given the low level at a transition time instant T'8. This makes the serial input request signal generating circuit 51 immediately produce the serial input request signal at another transition time instant T'9.

The serial input response signal is kept at the high level by the external circuit at the transition time instant T'9. The input processing control circuit 25 therefore produces the shift allow signal at another time instant T'10. This restarts the input processing of a third serial data segment beginning with a bit numbered 62.

FIGS. 3 through 5 will be reviewed. In FIG. 2, the high level is given to the parallel register empty signal and to the serial input request signal by the parallel data transfer signal produced by the program with the high level at the transition time instant T'5 depicted in FIG. 5. This restarts in FIG. 2 the input processing of the third serial data segment. In contrast, it is insured in FIGS. 3 through 5 to suspend or interrupt the input processing of the third serial data segment until the serial input suspension flag 37 is reset.

Referrring more particularly to FIGS. 3 and 5, suspension or interruption of the input processing becomes effective when the parallel or the fresh datum is transferred from the parallel register 31 to the data bus 11 and after the serial input request signal for the second serial data segment is already produced. Two transfer bit lengths of the input serial data are therefore held in the serial input interface circuit when the input processing is acgually suspended at the time instant T'4. One of the two transfer bit lengths is the first serial data segment stored as the parallel or the fresh datum in the parallel register 31. The other is the second serial data segment remaining in the shift register 23 as the shifted signal.

It is consequently possible with the serial input interface circuit being illustrated to make the program produce the serial input suspension request signal at any time during progress of the input processing regardless of presence and absence of the parallel register empty signal. Furthermore, it is possible to avoid useless input processing of the input serial data. In addition, it is possible to make the serial input interface circuit hold a predetermined number of transfer bit lengths of the input serial data when the input processing is actually suspended. This is possible, if desired, as by using in the serial input suspension carry out flag 39 depicted in FIG. 4 a delay circuit (not shown) for giving an output signal of the JK flip-flop circuit 47 a delay equal to a product of the transfer bit length and an integer which is equal to the predetermined number less two.

While this invention has thus far been described in specific conjunction with a single preferred embodiment thereof, it will now be readily possible for one skilled in the art of manufacture of the serial input interface circuit in general to carry out this invention into effect in various other manners. Above all, it is possible to set the serial input suspension request flag 37 by the program while the parallel register empty signal has the low level. Even in this event, operation is not different except that the serial input suspension carry out flag 37 is set when the shift clock builds down in the clock period in which the serial input suspension flag 37 is set.

What is claimed is:

1. A serial input interface circuit in which a serial input request signal and a serial input response signal are used in a handshake fashion to start input processing of input serial data, said input interface circuit comprising a data bus; a data input terminal supplied with said input serial data; a shift register coupled to said data input terminal to fetch and shift said input serial data as shifted signal data when a shift allow signal is supplied thereto; an input processing control circuit, coupled to said shift register, for supplying said shift allow signal to said shift register when said input processing control circuit receives said serial input response signal generated in response to said serial input request signal; a parallel register connected to said shift register; a shift counter coupled to said shift register for counting said input serial data in response to said shift allow signal and producing a count end signal when a counting value reaches a predetermined transfer bit length; means coupled to said shift counter for causing said parallel register to store said shifted signal data as parallel data; transfer means connected to said data bus and said parallel register, for transferring said parallel data from said parallel register to said data bus when one of said parallel data is a fresh datum that has never been transferred to said data bus; a parallel register empty flag, means coupled to said parallel register, for producing a parallel register empty signal when said parallel register is in an empty state; a serial input suspension request flag means for producing a serial input suspension request signal in compliance with a program for dealing with transfer of said fresh datum to said data bus; a suspension carry out flag means, connected to said parallel register empty flag means and said serial input suspension request flag means, for producing a serial input suspension carry out signal when said serial input suspension request signal is produced under a condition that said parallel register empty signal is not produced; a serial input request signal producing circuit connected to said shift counter, said parallel register empty flag means and said serial input suspension carry out flag means are being operative for suspending generation of said serial input response signal in response to said serial input request signal when said serial input request signal producing circuit receives both of said parallel register empty signal and said serial input suspension carry out signal.

2. A serial input interface circuit as claimed in claim 1, wherein said serial input request signal producing circuit suspends production of said serial input request signal when said serial input suspension carry out signal is produced, regardless of whether or not said count end signal and said parallel register empty signal are produced.

3. A serial input interface circuit as claimed in claim 1, wherein said suspension carry out flag means comprises:

a NAND circuit connected to said parallel register empty flag and said serial input suspension request flag and supplied with said parallel register empty signal with inversion and with said serial input suspension request signal to produce a circuit output signal; and a JK flip-flop circuit connected to said serial input suspension request flag and said NAND circuit and supplied with said serial input suspension request signal with inversion and with said circuit output signal to produce said serial input suspension carry out signal.

4. A serial data input circuit comprising a serial data input terminal; a receiving circuit coupled to said serial data input terminal and having a first register and a second register, control circuit means responsive to a serial input request signal for returning a serial input response signal and allowing said receiving circuit to receive input data supplied to said serial data input terminal in response to said serial input response signal and storing said input data into said first register, first transferring means for transferring said input data stored in said first register to said second register to thereby bring said first register into an empty state; second transferring means for transferring said input data stored in said second register to a data bus to thereby bring said second register into an empty state, said control circuit means suspending a return of said serial input response signal in response to said serial input request signal when both of said first and second registers store data respectively input thereto; and a control terminal supplied with a serial input suspension request signal which is generated in asynchonism with any one of said serial input request signal and said serial input response signal, said control circuit means being coupled to said control terminal and returning said serial input response signal in response to said serial input request signal after receiving said serial input suspension signal to thereby allowing said receiving circuit to receive said input data and thereafter suspending return of said serial input response signal in response to said serial input request signal after said receiving circuit has received said input data.

* * * * *